2,979,491
SUSPENSION POLYMERIZATION PROCESS

Robert A. Piloni, Pottstown, Pa., assignor to The Firestone Tire & Rubber Company, Akron, Ohio, a corporation of Ohio No Drawing. Filed May 10, 1957, Ser. No. 658,224

2 Claims. (Cl. 260—92.8)

This invention relates to a novel process for the polymerization, in aqueous suspension, of ethylenically unsaturated compounds.

A common method for the polymerization of unsaturated monomers consists in suspending and agitating the monomers and a suitable catalyst in an aqueous medium containing a hydrophilic colloidal suspending agent such as gelatin, starch, polyvinyl alcohol, cellulose ethers or the like. This method is known as suspension polymerization and, while it is highly economical and efficient in operation, nevertheless has the drawback that suspending agent becomes entrapped in the polymeric product, and produces a haze in solutions, coatings, films and other products made therefrom. Likewise, resins tend to have small discontinuities or "seeds" therein, which show up as discontinuities and blemishes in solutions and coatings containing the resins. These technical deficiencies of the resins may of course be remedied by polymerizing the monomers in systems not involving suspending agents, for instance by polymerization in mass, or in solution in solvents. However, these other processes are much more expensive, and require that the resins be sold at correspondingly higher prices which exclude many potential end uses.

Accordingly, it is an object to provide a novel and improved suspension polymerization process.

Another object is to provide such a process, the polymeric products from which will be free of haze.

Another object is to provide such a polymeric product which will be free from "seeds."

Still another object is to provide novel suspending agents for suspension polymerization processes, which will not produce haze in the polymeric products and which will avoid or greatly minimize the production of "seeds" in the polymeric products.

SYNOPSIS OF THE INVENTION

The above and other objects are secured, in accordance with this invention, by the use of salts of polymeric amines as suspending agents in the aqueous suspension polymerization of ethylenically unsaturated monomers. The polymeric products obtained are free from haze, both in solution in solvents, and in isolated form in coatings, films, sheets, etc. Likewise the resins are characterized by greatly improved homogeneity, as compared to suspension-polymerized resins heretofore produced, being substantially free of "seeds" or discontinuous bodies of resin.

THE SALTS OF POLYMERIC AMINES

The polymeric amines, the salts of which are used as suspending agents in the practice of this invention, comprise high polymeric hydrocarbon chains having amine groups attached at intervals therealong. A preferred type of such polymeric amine comprises the polymer of N,N-diethylamino ethyl methacrylate, and a preferred anion for forming a salt therewith is the phosphate ion. However, any other high polymeric substances having a polymeric long-chain hydrocarbon chain backbone with amine groups attached at intervals thereto may be used. The amine groups should occur with an average frequency of one amine group for every 2 to 4 carbon atoms in the long-chain skeleton, and the amine group may be attached to the skeleton, either directly or through hydrocarbon chains which may be interrupted by ether, thioether, ester, thioester, amide or like innocuous linkages. The amine groups may be primary, secondary or tertiary, the last of these being preferred. Exemplary polyamines will thus be seen to include the polymers of the (preferred) 2-(N,N-dimethylamino)ethyl methacrylate, 2-(N,N-diethylamino)ethyl methacrylate, 2-(N,N-butylamino)ethyl methacrylate, vinyl dimethylamino acetate, vinyl beta-dimethylamino propionate, 2-(N,N-dimethylamino)ethyl acrylate, 2-(N,N-diethylamino)ethyl acrylate, 2-(N-ethyl,N-methylamino)ethyl methacrylate, 2-(N-ethyl, N-methylamino)ethyl acrylate, and quaternary salts of the mentioned tertiary amines such as the methyl sulfate quaternary of (dimethylamino)ethyl methacrylate.

It will be understood that the polymeric chains need not be made up exclusively of a single one of the above amine-group-containing monomers, but may contain mixtures of the monomers and may also contain comonomers not having amine groups therein, such as acrylonitrile, vinyl ethers, vinyl formate, maleic anhydride, maleic acid, methacrylic acid, acrylic acid, itaconic acid and the like, the amount of such comonomers being limited, of course, by the qualification that the polymer shall contain at least one amino group for every 6 carbon atoms in the main skeleton of the polymer. Polymers of the above types may be made by adding a peroxide catalyst to the appropriate monomers in the absence of any solvents. Inasmuch as, however, the monomers are usually soluble in water, it will be most convenient to dissolve them in water (acidified if necessary to bring the monomer into solution) and to add a suitable peroxidic catalyst such as potassium persulfate, whereby the monomer is caused to polymerize. Conditions of polymerization should be so chosen as to yield a polymer having a Brookfield viscosity, using the #2 spindle at 30 r.p.m. in 10% aqueous solution, of at least 300 centipoises. Higher concentrations of catalyst and higher temperatures result in polymers of lower viscosity, and these factors can be adjusted to yield polymeric amines of the desired characteristics. In general, using potassium persulfate as the catalyst, a concentration of 0.2% of persulfate, based on the weight of monomer, and a polymerization temperature of 25° C. maintained for 24 hours, will produce suitable polymers. As above noted, the phosphate ion is preferred as the anionic constituent of the polymeric salt; however, other ions may be used such as the sulfate, nitrate, chloride, acetate, chloroacetate, carbonate, propionate, oxalate, formate, butyrate, maleate, acrylate and methacrylate ions. During the polymerization of the amine-containing monomer, the pH should be maintained fairly close to a value of 7, say from 6.5 to 7.5. Particularly, values below 6.5 tend to retard the polymerization of the amine. After the amine-group-containing monomer has become polymerized, and as it is used as the suspending agent in the polymerization of other monomers, the pH should be adjusted to the acid side, say in the range of 1–7, unless the monomers to be polymerized contain an acidic constituent such as acrylic acid, maleic acid or the like.

THE MONOMERS POLYMERIZED IN ACCORDANCE WITH THIS INVENTION

Any of the water-insoluble ethylenically unsaturated polymerizable compounds which are amenable to the aqueous suspension polymerization processes as heretofore practiced, may be polymerized by the process of this invention. Examples of such monomers include for instance vinyl chloride, vinylidene chloride and vinyl esters such as vinyl acetate, vinyl propionate, vinyl stearate and the like; maleic, chloromaleic and fumaric full and half-esters such as diethyl maleate, dibutyl maleate, dibutyl fumarate, monobutyl monohydrogen fumarate and maleate and mixtures of these isomers; esters of 3,6-endo-methylene-1,2,3,6-tetrahydro-cis-phthalic acid, such as the dimethyl, diethyl, dibutyl, or the monobutyl monohydrogen esters; acrylic, alkacrylic and chloroacrylic esters such as ethyl acrylate, ethyl chloroacrylate, methyl methacrylate, ethyl methacrylate and the like; vinyl aromatics such as styrene, stilbene, vinyl toluene, and the like; and vinyl ethers such as vinyl methyl ether, vinyl ethyl ether, vinyl propyl ether, vinyl butyl ether and the like. All of these and other customary monomers, or mixtures thereof, may be polymerized in accordance with this invention.

THE SUSPENSION POLYMERIZATION MANIPULATION

In general this manipulation involves agitating and suspending the monomers in an aqueous medium containing dissolved therein the polymeric amine suspending agent described hereinabove. The aqueous medium should constitute at least about half of the weight of the entire polymerization mass, including monomers and suspension medium, and the polymeric amine should be present to the extent of from .04 to 1%, based on the weight of the aqueous medium. There would be no theoretical upper limit to the amount of aqueous medium, although amounts greater than about 80% of the entire polymerization mass will be rather bulky and wasteful of reactor space. The reaction is promoted by the presence of free-radical-generating agents soluble in the monomer phase of the polymerization mass, such as benzoyl peroxide, perbenzoic acid, p-chlorobenzoyl peroxide, t-butyl hydroperoxide, lauroyl peroxide, caproyl peroxide, and the like. As above noted, the pH should be adjusted to the acid side, say to values of 1-7, unless an acidic monomer is present, in which case the pH need not be adjusted to any particular value. The aqueous phase and the monomer phase are agitated together so as to keep the latter suspended in the former, without, however, applying so intense a degree of agitation as to produce a permanent emulsion. As will appear from the discussion of suspension polymerization on page 143, line 7 of "Polymers and Resins," by Golding (D. Van Nostrand Company, Inc.), the art refers to droplets of monomers so dispersed as "beads" or "pearls." Industrially, the most convenient degree of agitation will usually be on the order of 3 to 15, on the Pfaudler scale, although higher and lower values may be used. The temperatures are adjusted to values such as to initiate the polymerization reaction, usually on the order of 30°-100° C., although temperatures down to the freezing point of the suspension medium may be used where especially active catalysts such as the redox catalysts are used. The monomers in the suspension become polymerized, yielding a suspension of granular resin in the aqueous medium. From this aqueous medium, the resin may be recovered mechanically, as by filtration, centrifugation or the like.

THE PRODUCT RESINS

The resins produced in accordance with this invention are free from the haze which is usually present in suspension polymerized resins due to carryover of the suspending agents into the resins. In this respect the resins of this invention are the equals of the more expensive resins produced by mass and solution polymerization. Besides being applicable in all those uses where the more expensive resins have heretofore been used, the resins of this invention will open up many new applications which require optically clear resins but which do not justify the added cost heretofore required. The resins produced in accordance with this invention are also much freer, than the conventional suspension polymerizates, of "seeds," i.e., local areas of resin which are harder and less soluble than the general mass of the resin, which seeds show up as discontinuities and surface irregularities in films, coatings and the like made from the resin. Resins produced in accordance with this invention may be used in any applications where clarity and homogeneity are desirable, as for instance in convertible automobile windows, aircraft windows, cheap optical components, costume jewelry, clear lacquer coatings for linoleum, metal, wood, leather, paper, clear strip coatings and the like.

With the foregoing general discussion in mind, there are given herewith detailed examples of the practice of this invention. All parts given are by weight.

Example I

A. PREPARATION OF POLYMERIC AMINE SALT

| | Parts |
|---|---|
| Aqueous 2 - (diethylamino)ethyl methacrylate (92% solution in water) | 14 |
| Potassium persulfate | 0.05 |
| Phosphoric acid solution (85% solution in water) | 1.70 |
| Water (deionized) | 75 |

The above ingredients were thoroughly mixed together and allowed to stand for 24 hours. There resulted a viscous hazy solution of polymerized 2-(diethylamino)ethyl methacrylate, which was adjusted to a pH of 6.9 by addition of phosphoric acid. The solution contained 14.2% of polymeric 2-(diethylamino)ethyl methacrylate phosphate salt.

B. SUSPENSION POLYMERIZATION

| | |
|---|---|
| Vinyl chloride | 70.00 parts. |
| Dibutyl maleate | 21.67 parts. |
| Monobutyl monohydrogen maleate | 8.35 parts. |
| Trichloroethylene | 3.30 parts. |
| Benzoyl peroxide | .80 part. |
| Polymeric 2 - (diethylamino)ethyl methacrylate solution (prepared as above described) | .10 part (as weight of solids contained in solution). |
| Water (deionized) | 175 parts. |

The above ingredients were charged into a closed reactor which had previously been purged with vinyl chloride vapor. Agitation was commenced at a Pfaudler intensity of 5 and the temperature adjusted to 65° C., these conditions being maintained for 24 hours. At the end of this time, the unreacted monomers were vented, and the suspension of polymerized material discharged and filtered to recover the polymer, the latter being washed on the filter with water and then dried. The resultant resins formed solutions and coatings of exceptional clarity and freedom from "seeds" and other discontinuities.

Example II

| | |
|---|---|
| Vinyl chloride | 100 parts. |
| Benzoyl peroxide | .80 part. |
| Polymeric 2 - (diethylamino)ethyl methcrylate solution (prepared as described in Example I-A) | .08 part (as weight of solids contained in solution). |
| Water | 165 parts. |

The above ingredients were charged into a closed tumbling vessel and the free space purged with nitrogen. Tumbling was commenced, the temperature raised to 50° C., these conditions being maintained for 18 hours. At the end of this time, the unreacted vinyl chloride was vented, and the reaction mass cooled to 25° C., discharged and filtered to recover the polymer, the latter being washed repeatedly on the filter with deionized water.

The resultant polymer, when pressed at 180° C., gave plaques of vastly superior clarity as compared with conventional suspension-polymerized vinyl chloride resins.

Example III

| | |
|---|---|
| Methyl methacrylate | 100 parts. |
| Lauroyl peroxide | 1.00 part. |
| Polymeric 2 - (diethylamino)ethyl methacrylate solution (prepared as described in Example I-A) | .10 part (as weight of solids contained in solution). |
| Water | 125 parts. |

The above ingredients were charged into a flask provided with a stirrer and heating mantle. The free space was purged with nitrogen, agitation commenced, and the temperature adjusted to 70° C., these conditions being maintained for 36 hours. At the end of this time, the granular suspension was filtered to recover the polymer, which was thoroughly washed with deionized water and dried. Plaques pressed from the polymer were fully equal in clarity to polymerization-cast sheets of polymethyl methacrylate.

Example IV

| | |
|---|---|
| Vinyl acetate | 100 parts. |
| p-Chlorobenzoyl peroxide | .90 part. |
| Polymeric 2 - (diethylamino)ethyl methacrylate solution (prepared as described in Example I-A) | .10 part (as weight of solids contained in solution). |
| Water | 150 parts. |

The above ingredients were reacted together, and the polymeric product recovered as described in the preceding example. The resultant polymer was converted to a polyvinyl butyral, and calendered out into a glass-laminating foil. A laminated windshield glass made with the resultant foil was the full equal, in clarity, to a glass laminated with a polyvinyl butyral derived from a solution-polymerized polyvinyl acetate.

Example V

| | |
|---|---|
| Styrene | 78 parts. |
| Acrylonitrile | 22 parts. |
| Caproyl peroxide | 0.8 part. |
| Polymeric 2 - (diethylamino)ethyl methacrylate solution (prepared as described in Example I-A) | .08 part (as weight of solids contained in solution). |
| Water | 175 parts. |

The above ingredients were reacted together, and the polymer recovered, as described in Example III. The product was a tough resin of exceptional clarity, suitable for fabrication into inexpensive toy optical parts such as kaleidoscope prisms, toy moving picture projector optical shutters, and the like.

Example VI

| | Parts |
|---|---|
| Vinyl chloride | 45 |
| Dibutyl maleate | 15 |
| Trichloroethylene | 1 |
| Benzoyl peroxide | .5 |
| Commercial phosphate of an amine-group-containing polymer (GM-650, manufactured by the Rohm & Haas Co.) | .08 |

The above ingredients were reacted together as in Example III. The resultant polymer dissolved in toluene to the extent of 15%, to yield optically clear solutions completely free of "seeds" or other discontinuities.

Example VII

| | |
|---|---|
| Vinylidene chloride | 42 parts. |
| Methyl acrylate | 13 parts. |
| Monobutyl monohydrogen ester of 3, 6-endomethylene - tetrahydro - cis-phthalic acid | 5 parts. |
| Benzoyl peroxide | 0.5 part. |
| Polymeric 2 - (diethylamino)ethyl methacrylate solution (prepared as described in Example I-A) | 1.0 part (as weight of solids contained in solution). |
| Water (deionized) | 100 parts. |

The above ingredients were charged into a closed tumbling reactor, the free space purged with nitrogen, and the ingredients were tumbled at 65° C. for 24 hours. At the end of this time, the vessel was vented, the contents blown with steam to sweep out the unreacted monomers, and the contents thereafter cooled to room temperature, discharged, and filtered to recover the polymer. A 15% solution of the polymer in toluene was optically clear.

Example VIII

A. PREPARATION OF POLYMERIC AMINE

| | Grams |
|---|---|
| 2-(dimethylamino)ethyl methacrylate | 10 |
| Aqueous phosphoric acid solution (85% $H_3PO_4$) | 2 |
| Potassium persulfate | 0.05 |
| Water (distilled) | 90 |

The above ingredients were thoroughly mixed together and allowed to stand at 50° C. for 24 hours. There resulted a viscous solution of poly [2-(dimethylamino)-ethyl methacrylate] phosphate salt.

B. USE IN POLYMERIZATION

| | Grams |
|---|---|
| Vinyl chloride | 42 |
| Dibutyl maleate | 13 |
| Monohydrogen monobutyl maleate | 5 |
| Trichloroethylene | 2 |
| Benzoyl peroxide | 0.5 |
| Poly [2-(dimethylamino)ethyl methacrylate] phosphate (as solids in solution prepared as described above) | 0.1 |
| Water | 100 |

The above ingredients were charged into a bottle, the free space purged with nitrogen, and the bottle sealed. The bottle was tumbled in a bath at 65° C. for 24 hours, then cooled to 25° C. and the unreacted monomers vented. The polymer was recovered by filtration, washed on the filter with distilled water, and dried. The resultant polymer had excellent solution clarity and was free from "seeds" and other discontinuities.

Example IX

A. PREPARATION OF POLYMERIC AMINE

The procedure of Example VIII-A was repeated, using di-(2-ethylamino)ethyl acrylate in place of the di-(2-methylamino)ethyl methacrylate.

B. POLYMERIZATION

| | Grams |
|---|---|
| Vinyl chloride | 45 |
| Dibutyl maleate | 15 |
| Trichloroethylene | 2 |
| Benzoyl peroxide | 0.5 |
| Poly [2-(diethylamino)ethyl acrylate] phosphate (as solids in solution prepared per A above) | 0.1 |

The above ingredients were polymerized by the procedure of Example VIII-B above. The resultant polymer had excellent solution clarity, and coatings and plaques made from the resin were also optically clear.

Example X.—Amine copolymers

A. PREPARATION OF POLYMERIC AMINE

| | Grams |
|---|---|
| 2-(diethylamino)ethyl acrylate | 5 |
| Maleic anhydride | 5 |
| Potassium persulfate | 0.5 |
| Water (distilled) | 100 |

The above ingredients were thoroughly mixed and allowed to stand at 25° C. for 24 hours. There resulted a viscous solution of a copolymer of maleic acid and di-2-(diethylamino)ethyl acrylate.

B. POLYMERIZATION

| | Grams |
|---|---|
| Vinyl chloride | 60 |
| Lauroyl peroxide | 0.4 |
| Copolymer of diethylamino ethyl acrylate and maleic anhydride (prepared as just described; as dry solids in solution) | 0.3 |
| Water (distilled) | 100 |

The above ingredients were charged into a bottle, the free space in the bottle purged by evaporation of a portion of the vinyl chloride, and the bottle sealed and tumbled in a water bath at 50° C. for 24 hours. The bottle was then cooled to 25° C., the unpolymerized vinyl chloride vented, and the polymer recovered by filtration, washed and dried. Articles molded from the resultant resin had excellent optical clarity.

Example XI

Example X was exactly repeated, except that the maleic anhydride of the recipe under X-A was replaced by methacrylic acid. Again, a resin of excellent clarity was obtained.

Equivalent results were obtained in accordance with both Examples X and XI, varying the ratio of the acid and amine monomer in the suspending agent over the range 1:11 to 11:1.

From the foregoing general description and detailed specific examples, it will be evident that this invention provides a novel aqueous suspension polymerization process which yields polymeric products equalling, in optical clarity and homogeneity, the products of the much more expensive and difficult solution and mass polymerization processes. The amine-group-containing polymers used in the process are inexpensive and are, moreover, used only in very small amounts.

What is claimed is:

1. Process of polymerizing vinyl chloride which comprises agitating and suspending, as pearls, the vinyl chloride in an aqueous medium, a free radical generating catalyst soluble in the vinyl chloride being present in the reaction mass, the suspension being stabilized by the presence, in the aqueous medium, of a phosphate of a polymer of 2-(diethylamino)ethyl methacrylate, said aqueous medium constituting at least half of the entire weight of the polymerization mass, the polymer of 2-(diethylamino)ethyl methacrylate being present in aqueous medium to the extent of .04–1.0% based on the weight of the aqueous medium, the temperature of the reaction mass being in the range 30°–100° C. the pH of the aqueous medium in the range 1–7 and the agitation being of an intensity of 3–15 on the Pfaudler scale.

2. Process of polymerizing vinyl chloride, which comprises agitating and suspending, as pearls, the vinyl chloride in an aqueous medium, a free radical generating catalyst soluble in the vinyl chloride being present in the reaction mass, the suspension being stabilized by the presence, in the aqueous medium, of a phosphate of a polymer selected from the group consisting of polymers of 2-(N,N-dimethylamino)ethyl methacrylate, 2-(N,N-diethylamino)ethyl methacrylate, 2-(N,N-dibutylamino)-ethyl methacrylate, vinyl dimethylamino acetate, vinyl beta-dimethylamino propionate, 2-(N,N-dimethylamino)-ethyl acrylate, 2-(N,N-diethylamino)ethyl acrylate and 2-(N-ethyl, N-methylamino)ethyl methacrylate, 2-(N-ethyl, N-methylamino)ethyl acrylate, the aqueous medium constituting at least half of the entire weight of the reaction mass, the selected polymers being present in the aqueous medium to the extent of .04–1.0% based on the weight of the aqueous medium, the temperature of the reaction mass being 30°–100° C., the pH of the aqueous medium being in the range 1–7 and the agitation being of an intensity of 3–15 on the Pfaudler scale.

References Cited in the file of this patent

UNITED STATES PATENTS

| 2,029,410 | Carothers et al. | Feb. 4, 1936 |
| 2,133,257 | Strain | Oct. 11, 1938 |
| 2,138,763 | Graves | Nov. 29, 1938 |